United States Patent
Faitelson et al.

(10) Patent No.: US 8,601,592 B2
(45) Date of Patent: Dec. 3, 2013

(54) DATA MANAGEMENT UTILIZING ACCESS AND CONTENT INFORMATION

(75) Inventors: Yakov Faitelson, Elkana (IL); Ohad Korkus, Herzilia (IL); Ophir Kretzer-Katzir, Reut (IL); David Bass, Beit Hashmonai (IL)

(73) Assignee: Varonis Systems, Inc., New York, NY (US)

( * ) Notice: Subject to any disclaimer, the term of this patent is extended or adjusted under 35 U.S.C. 154(b) by 249 days.

(21) Appl. No.: 12/772,450

(22) Filed: May 3, 2010

(65) Prior Publication Data

US 2011/0060916 A1 Mar. 10, 2011

Related U.S. Application Data

(60) Provisional application No. 61/240,726, filed on Sep. 9, 2009.

(51) Int. Cl.
*H04L 9/32* (2006.01)

(52) U.S. Cl.
USPC ............. 726/26; 726/27; 713/189; 713/193

(58) Field of Classification Search
USPC ............ 713/189–193; 707/661, E17.05, 783, 707/665, 659, 705, 708, 790–791, 821; 726/26–30
See application file for complete search history.

(56) References Cited

U.S. PATENT DOCUMENTS

| | | |
|---|---|---|
| 5,465,387 A | 11/1995 | Mukherjee |
| 5,889,952 A | 3/1999 | Hunnicutt et al. |
| 5,899,991 A | 5/1999 | Karch |
| 6,308,173 B1 | 10/2001 | Glasser et al. |
| 6,338,082 B1 | 1/2002 | Schneider |
| 6,393,468 B1 | 5/2002 | McGee |
| 6,772,350 B1 | 8/2004 | Belani et al. |
| 6,928,439 B2 | 8/2005 | Satoh |
| 7,031,984 B2 | 4/2006 | Kawamura et al. |
| 7,068,592 B1 | 6/2006 | Duvaut et al. |
| 7,124,272 B1 | 10/2006 | Kennedy et al. |
| 7,403,925 B2 | 7/2008 | Schlesinger et al. |
| 7,421,740 B2 | 9/2008 | Fey et al. |
| 7,529,748 B2 | 5/2009 | Wen et al. |
| 7,555,482 B2 | 6/2009 | Korkus |

(Continued)

FOREIGN PATENT DOCUMENTS

| | | |
|---|---|---|
| CN | 1588889 A | 3/2005 |
| EP | 1 248 178 B1 | 1/2004 |

OTHER PUBLICATIONS

An International Search Report and a Written Opinion both dated Nov. 15, 2011 which issued during the prosecution of Applicant's PCT/IL11/00408.

(Continued)

*Primary Examiner* — Hosuk Song
(74) *Attorney, Agent, or Firm* — Ladas & Parry LLP

(57) ABSTRACT

A system for operating an enterprise computer network including multiple disparate clients, data elements and computer resources, the system including monitoring and collection functionality for providing continuously updated metadata relating to at least one of actual access, access permissions and content of the data elements and operating functionality utilizing the continuously updated metadata provided by the monitoring and collection functionality for functions other than reporting the at least one of actual access, access permissions and content or recommending changes in the access permissions.

57 Claims, 7 Drawing Sheets

(56) References Cited

U.S. PATENT DOCUMENTS

| | | | |
|---|---|---|---|
| 7,606,801 | B2 | 10/2009 | Faitelson et al. |
| 7,716,240 | B2 | 5/2010 | Lim |
| 2003/0048301 | A1 | 3/2003 | Menninger |
| 2003/0051026 | A1 | 3/2003 | Carter et al. |
| 2003/0231207 | A1 | 12/2003 | Huang |
| 2004/0186809 | A1 | 9/2004 | Schlesinger et al. |
| 2004/0249847 | A1 | 12/2004 | Wang et al. |
| 2004/0254919 | A1 | 12/2004 | Giuseppini |
| 2005/0065823 | A1 | 3/2005 | Ramraj et al. |
| 2005/0086529 | A1 | 4/2005 | Buchsbaum |
| 2005/0108206 | A1 | 5/2005 | Lam et al. |
| 2005/0120054 | A1 | 6/2005 | Shulman et al. |
| 2005/0203881 | A1 | 9/2005 | Sakamoto et al. |
| 2005/0246762 | A1 | 11/2005 | Girouard et al. |
| 2005/0278334 | A1 | 12/2005 | Fey et al. |
| 2006/0064313 | A1 | 3/2006 | Steinbarth et al. |
| 2006/0184459 | A1 | 8/2006 | Parida |
| 2006/0184530 | A1 | 8/2006 | Song et al. |
| 2006/0277184 | A1 | 12/2006 | Faitelson et al. |
| 2007/0033340 | A1 | 2/2007 | Tulskie et al. |
| 2007/0061487 | A1 | 3/2007 | Moore et al. |
| 2007/0073698 | A1 | 3/2007 | Kanayama et al. |
| 2007/0112743 | A1 | 5/2007 | Giampaolo et al. |
| 2007/0156693 | A1 | 7/2007 | Soin et al. |
| 2007/0198608 | A1* | 8/2007 | Prahlad et al. ............... 707/202 |
| 2007/0203872 | A1 | 8/2007 | Flinn et al. |
| 2007/0244899 | A1 | 10/2007 | Faitelson et al. |
| 2007/0266006 | A1 | 11/2007 | Buss |
| 2007/0276823 | A1 | 11/2007 | Borden et al. |
| 2007/0282855 | A1 | 12/2007 | Chen et al. |
| 2008/0172720 | A1 | 7/2008 | Botz et al. |
| 2008/0270462 | A1 | 10/2008 | Thomsen |
| 2008/0271157 | A1 | 10/2008 | Faitelson et al. |
| 2009/0100058 | A1 | 4/2009 | Faitelson et al. |
| 2009/0119298 | A1 | 5/2009 | Faitelson et al. |
| 2009/0150981 | A1 | 6/2009 | Amies et al. |
| 2009/0182715 | A1 | 7/2009 | Falkenberg |
| 2009/0198892 | A1 | 8/2009 | Alvarez et al. |
| 2009/0249446 | A1 | 10/2009 | Jenkins et al. |
| 2009/0265780 | A1 | 10/2009 | Korkus et al. |
| 2009/0320088 | A1 | 12/2009 | Gill et al. |
| 2010/0037324 | A1 | 2/2010 | Grant et al. |

OTHER PUBLICATIONS

An International Search Report and a Written Opinion both dated Jun. 14, 2011 which issued during the prosecution of Applicant's PCT/IL11/00066.

An International Search Report and a Written Opinion both dated May 24, 2011 which issued during the prosecution of Applicant's PCT/IL11/00077.

USPTO OA mailed Dec. 14, 2010 in connection with U.S. Appl. No. 11/786,522.

USPTO OA mailed Dec. 14, 2010 in connection with U.S. Appl. No. 11/789,884.

Sahadeb DE, et al; "Secure Access Control in a Multi-user Geodatabase", available on the internet at: URL http://www10.giscafe.com.2005.

Sara C. Madeira, et al; "Biclustering Algorithms for Biological Data Analysis: A Survey", Mar. 2004; http://www.cs.princeton.edu/courses/archive/spr05/cos598E/bib/bicluster.pdf.

Sara C. Madeira; "Clustering, Fuzzy Clustering and Biclustering: An Overview" p. 31-53, Jun. 27, 2003.

S.R. Kleiman; Vnodes: An Architecture for Multiple File System Types in Sun UNIX, USENIX Association: Summer Conference Proceedings, Atlanta 1986, pp. 1-10.

Findutils; GNU Project-Free Software Foundation (FSF), 3 pages, Nov. 2006.

Genunix; "Writing Filesystems—VFS and Vnode interfaces", 5 pages, Oct. 2007.

USPTO OA mailed Aug. 1, 2008 in connection with U.S. Appl. No. 11/258,256.

USPTO OA mailed Oct. 31, 2008 in connection with U.S. Appl. No. 11/635,736.

USPTO OA mailed Feb. 12, 2008 in connection with U.S. Appl. No. 11/258,256.

USPTO OA mailed Jul. 9, 2010 in connection with U.S. Appl. No. 11/789,884.

Written Opinion of the International Searching Authority dated May 20, 2010 issued during prosecution of Applicants PCT/IL10/00069.

International Search Report: PCT/IL10/00069.

An International Preliminary Report on Patentability dated Jul. 31, 2012, which issued during the prosecution of Applicant's PCT/IL2011/000066.

International Preliminary Report on Patentability dated Mar. 22, 2012 issued during the prosecution of PCT/IL2010/000069.

USPTO NFOA mailed Sep. 14, 2012 in connection with U.S. Appl. No. 12/861,967.

USPTO NFOA mailed Aug. 28, 2012 in connection with U.S. Appl. No. 12/673,691.

International Search Report and Written Opinion dated Oct. 1, 2012 issued during prosecution of Applicant's PCT/IL2012/000240.

An English Translation of an Office Action dated Sep. 14, 2012, which issued during the prosecution of German Patent Application No. 11 2006 001 378.5.

Weippl et al., Content-Based Management of Documents Access Control, 14th International Conference on Applications of Prolog (INAP), Oct. 20-22, 2001., University of Tokyo, Tokyo Japan, pp. 78-86.

* cited by examiner

DATA MANAGEMENT UTILIZING ACCESS AND CONTENT INFORMATION

REFERENCE TO RELATED APPLICATIONS

Reference is made to U.S. Provisional Patent Application Ser. No. 61/240,726, filed Sep. 9, 2009 and entitled "USE OF ACCESS METRIC IN LARGE SCALE DATA MANIPULATION", the disclosure of which is hereby incorporated by reference and priority of which is hereby claimed pursuant to 37 CFR 1.78(a) (4) and (5)(i).

Reference is also made to U.S. patent application Ser. No. 12/673,691, filed Jan. 27, 2010, and entitled "ENTERPRISE LEVEL DATA MANAGEMENT", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801; and

U.S. Published Patent Application Nos. 2007/0244899, 2008/0271157, 2009/0100058, 2009/0119298 and 2009/0265780.

FIELD OF THE INVENTION

The present invention relates to data management generally and more particularly enterprise level data management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos.: 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention provides improved systems and methodologies for data management.

There is thus provided in accordance with a preferred embodiment of the present invention a system for operating an enterprise computer network including multiple disparate clients, data elements and computer resources, the system including monitoring and collection functionality for providing continuously updated metadata relating to at least one of actual access, access permissions and content of the data elements and operating functionality utilizing the continuously updated metadata provided by the monitoring and collection functionality for functions other than reporting the at least one of actual access, access permissions and content or recommending changes in the access permissions.

Preferably, the functions other than actual access reporting include archiving. Additionally or alternatively the functions other than actual access reporting include encrypting.

In accordance with a preferred embodiment of the present invention, the system resides on a computer server which is connected to an enterprise level network to which is connected a multiplicity of computers and storage devices. Additionally, the computer resources include hardware resources and software resources.

There is also provided in accordance with another preferred embodiment of the present invention a system for operating an enterprise computer network including multiple disparate clients, data elements and computer resources, the system including monitoring and collection functionality for providing continuously updated metadata relating to actual access, access permissions and content of the data elements, and operating functionality utilizing the continuously updated metadata provided by the monitoring and collection functionality for recommending archiving of the data elements.

Preferably, the system also includes a backup storage facility connected to the enterprise computer network. Preferably, the system also includes a remote storage facility connected to the enterprise computer network. Preferably, the system also includes a secure storage facility connected to the enterprise computer network. Preferably, the computer resources include hardware resources and software resources.

In accordance with a preferred embodiment of the present invention, every day the system copies any of the data elements actually accessed by any user on that day to the backup storage facility. Additionally or alternatively, the system copies any of the data elements whose content indicates that they are confidential, are owned by a sensitive unit in the enterprise or are accessible by authorized individuals in the enterprise to the backup storage facility on a daily basis. Additionally or alternatively, the system copies any of the data elements marked with recommendations for changes in access permissions thereto to the backup storage facility on a daily basis.

Preferably, the system migrates to the remote storage facility any of the data elements that have recommendations for changes in access permissions thereto. Additionally or alternatively, the system migrates to the remote storage facility any of the data elements that have not been accessed for a first predetermined time period. Alternatively, the system migrates to the remote storage facility any of the data elements that have not been accessed for a first predetermined time period and that contain content indicating that they are confidential, are owned by a sensitive unit in the enterprise or are accessible by authorized individuals in the enterprise.

In accordance with a preferred embodiment of the present invention, the system migrates to the remote storage facility any of the data elements that have not been migrated to the remote storage facility for a second predetermined time period. Alternatively, the system migrates to the remote storage facility any of the data elements that have not been migrated to the remote storage facility for a second predetermined time period and that contain content indicating that they are confidential, are owned by a sensitive unit in the enterprise or are accessible by authorized individuals in the enterprise.

Preferably, the system migrates to the secure storage facility any of the data elements that contain personal identity information or sensitive information. Additionally or alternatively, when a user initiates a migration of data elements to a new storage device, the system recommends that all data elements actually accessed by any specified user or group of users, be migrated to the new storage device.

In accordance with a preferred embodiment of the present invention, at various times the system recommends that all data elements actually accessed by any specified user or group of users, be replicated to the backup storage facility. Additionally or alternatively, the system replicates to the backup storage facility any of the data elements whose content indicates that they are relevant to predetermined subjects.

Preferably, the system resides on a computer server which is connected to an enterprise level network to which is connected a multiplicity of computers and storage devices. Additionally or alternatively, an associated archiving system resides on a server other than the computer server.

There is further provided in accordance with yet another preferred embodiment of the present invention a system for operating an enterprise computer network including multiple disparate clients, data elements and computer resources, the system including monitoring and collection functionality for providing continuously updated metadata relating to actual access, access permissions and content of the data elements, and operating functionality utilizing the continuously updated metadata provided by the monitoring and collection functionality for recommending encrypting the data elements.

Preferably, for each individual data element of the data elements, at predetermined time intervals the system compiles a list of users having access permissions to each individual data element, compares the list of users to a predetermined list of authorized users, each of the authorized users being authorized to access confidential enterprise information, labels each individual data element that may be accessed by any of the authorized users as a confidential data element and encrypts the confidential data elements.

Additionally or alternatively, for each individual data element of the data elements, at predetermined time intervals the system compiles a list of users actually having accessed each individual data element, compares the list of users to a predetermined list of authorized users, each of the authorized users being authorized to access confidential enterprise information, labels each individual data element that has been accessed by any of the authorized users as a confidential data element and encrypts the confidential data elements.

Additionally or alternatively, for each individual data element of the data elements, at predetermined time intervals the system searches each individual data element for the appearance of any of a predetermined list of confidential information related terms, labels each individual data element that contains any of the predetermined list of confidential information related terms as a confidential data element and encrypts the confidential data elements.

Preferably, the computer resources include hardware resources and software resources. Additionally, the system resides on a computer server which is connected to an enterprise level network to which is connected a multiplicity of computers and storage devices. Additionally or alternatively, an associated encryption system resides on a server other than the computer server.

There is yet further provided in accordance with still another preferred embodiment of the present invention a method for operating an enterprise computer network including multiple disparate clients, data elements and computer resources, the method including monitoring and collecting continuously updated metadata relating to at least one of actual access, access permissions and content of the data elements and utilizing the continuously updated metadata for functions other than reporting the at least one of actual access, access permissions and content or recommending changes in the access permissions.

Preferably, the functions other than actual access reporting include archiving. Additionally or alternatively, the functions other than actual access reporting include encrypting. Preferably, the computer resources include hardware resources and software resources.

There is also provided in accordance with another preferred embodiment of the present invention a method for operating an enterprise computer network including multiple disparate clients, data elements and computer resources, the method including monitoring and collecting continuously updated metadata relating to actual access, access permissions and content of the data elements, and utilizing the continuously updated metadata for recommending archiving of the data elements.

Preferably, the method also includes providing a backup storage facility connected to the enterprise computer network. Preferably, the method also includes providing a remote storage facility connected to the enterprise computer network. Preferably, the method also includes providing a secure storage facility connected to the enterprise computer network. Preferably, the computer resources include hardware resources and software resources.

In accordance with a preferred embodiment of the present invention, every day any of the data elements actually accessed by any user on that day are copied to the backup storage facility. Additionally or alternatively, any of the data elements whose content indicates that they are confidential, are owned by a sensitive unit in the enterprise or are accessible by authorized individuals in the enterprise are copied to the backup storage facility on a daily basis. Additionally or alternatively, any of the data elements marked with recommendations for changes in access permissions thereto are copied to the backup storage facility on a daily basis.

Preferably, any of the data elements that have recommendations for changes in access permissions thereto are migrated to the remote storage facility. Additionally or alternatively, any of the data elements that have not been accessed for a first predetermined time period are migrated to the remote storage facility. Alternatively, any of the data elements that have not been accessed for a first predetermined time period and that contain content indicating that they are confidential, are owned by a sensitive unit in the enterprise or are accessible by authorized individuals in the enterprise are migrated to the remote storage facility.

In accordance with a preferred embodiment of the present invention, any of the data elements that have not been migrated to the remote storage facility for a second predetermined time period are migrated to the remote storage facility. Alternatively, any of the data elements that have not been migrated to the remote storage facility for a second predetermined time period and that contain content indicating that they are confidential, are owned by a sensitive unit in the enterprise or are accessible by authorized individuals in the enterprise are migrated to the remote storage facility.

Preferably, any of the data elements that contain personal identity information or sensitive information are migrated to the secure storage facility. Additionally or alternatively, when a user initiates a migration of data elements to a new storage device, all data elements actually accessed by any specified user or group of users are recommended to be migrated to the new storage device.

In accordance with a preferred embodiment of the present invention, at various times all data elements actually accessed by any specified user or group of users are recommended to be replicated to the backup storage facility. Additionally or alternatively, any of the data elements whose content indicates that they are relevant to predetermined subjects are replicated to the backup storage facility.

There is further provided in accordance with yet another preferred embodiment of the present invention a method for operating an enterprise computer network including multiple disparate clients, data elements and computer resources, the method including monitoring and collecting continuously updated metadata relating to actual access, access permissions and content of the data elements and utilizing the continuously updated metadata for recommending encrypting the data elements.

Preferably, for each individual data element of the data elements, at predetermined time intervals a list of users having access permissions to each individual data element is compiled, the list of users is compared to a predetermined list of authorized users, each of the authorized users being authorized to access confidential enterprise information, each individual data element that may be accessed by any of the authorized users is labeled as a confidential data element and the confidential data elements are encrypted.

Additionally or alternatively, for each individual data element of the data elements, at predetermined time intervals a list of users actually having accessed each individual data element is compiled, the list of users is compared to a predetermined list of authorized users, each of the authorized users being authorized to access confidential enterprise information, each individual data element that has been accessed by any of the authorized users is labeled as a confidential data element and the confidential data elements are encrypted.

Additionally or alternatively, for each individual data element of the data elements, at predetermined time intervals each individual data element is searched for the appearance of any of a predetermined list of confidential information related terms, each individual data element that contains any of the predetermined list of confidential information related terms is labeled as a confidential data element and the confidential data elements are encrypted.

Preferably, the computer resources include hardware resources and software resources.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
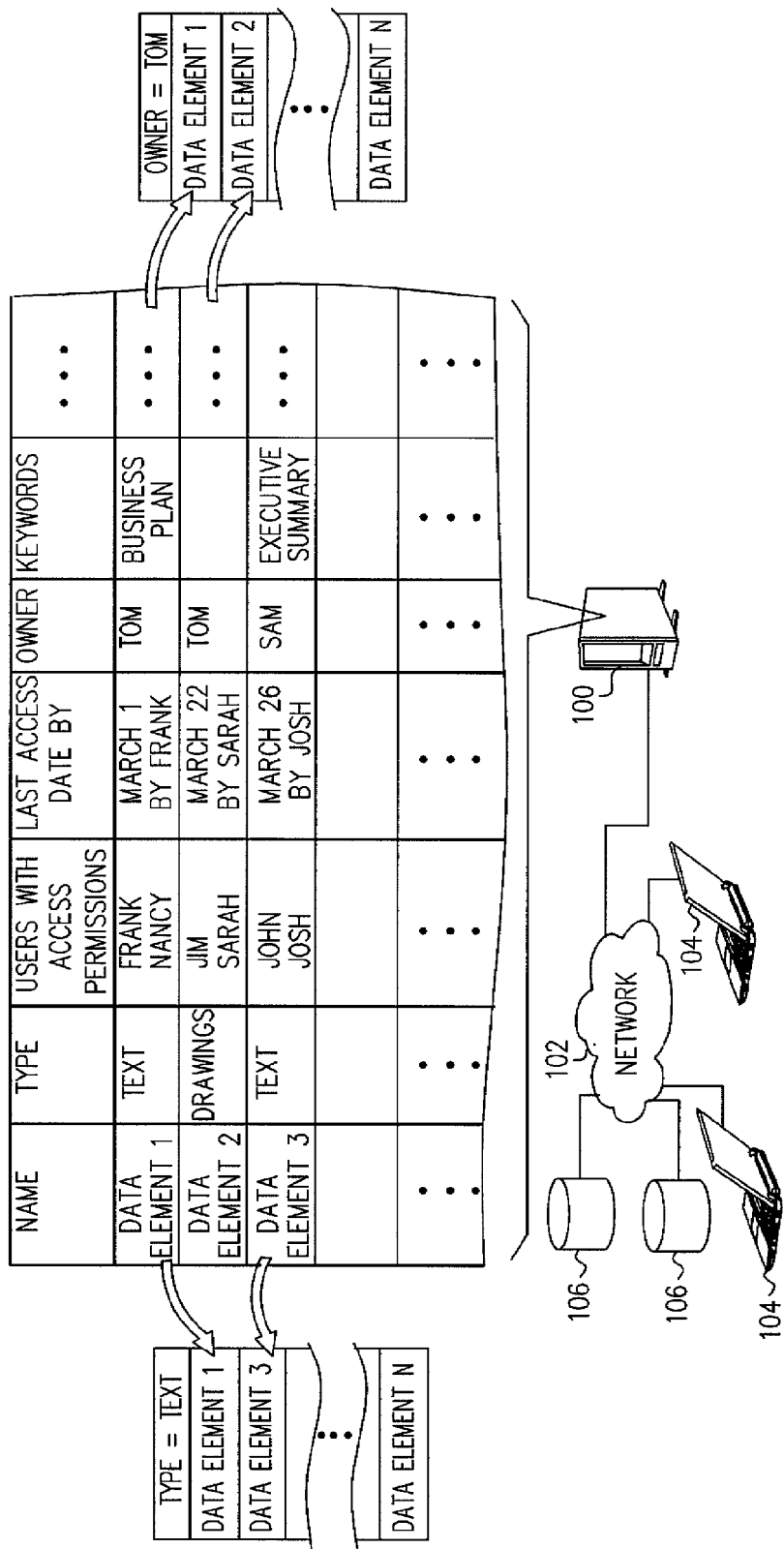
FIG. 1 is a simplified diagram illustrating operation of a rule-based system for management of data elements, constructed and operative in accordance with a preferred embodiment of the present invention.

Reference is now made to FIG. 1, which is a simplified diagram illustrating aspects of operation of a rule-based system for management of data elements, constructed and operative in accordance with a preferred embodiment of the present invention.

This system preferably is suitable for operating in an enterprise computer network including multiple disparate clients, data elements, computer hardware resources and computer software resources, and includes:

monitoring and collection functionality for providing continuously updated metadata relating to at least one of actual access, access permissions and content of the data elements; and operating functionality utilizing the continuously updated metadata provided by the monitoring and collection functionality for functions other than reporting at least one of actual access, access permissions and content or recommending changes in the access permissions.

As seen in FIG. 1, the system may reside on a server 100, connected to an enterprise level network 102 to which may be connected hundreds or thousands of computers 104 and storage devices 106. A matrix 108 is defined at any given time including all of the data elements in the enterprise at that time. Various characteristics of the data elements and metadata of the data elements are applied to the matrix and define subsets of the data elements meeting various criteria. A data element normally belongs to multiple subsets.

The term "metadata" for the purposes of this application is defined to include, inter alia, anything characterizing a data element other than the content thereof. Examples of metadata include size, type, creation date, keywords, last access date and access permissions.

The various data elements in the matrix are sorted according to the subsets to which they belong and various rules are applied to data elements which fall within various combinations of subsets. The results of application of these rules are higher level subsets, with each of which is associated a data element management recommendation.

Figure 2:
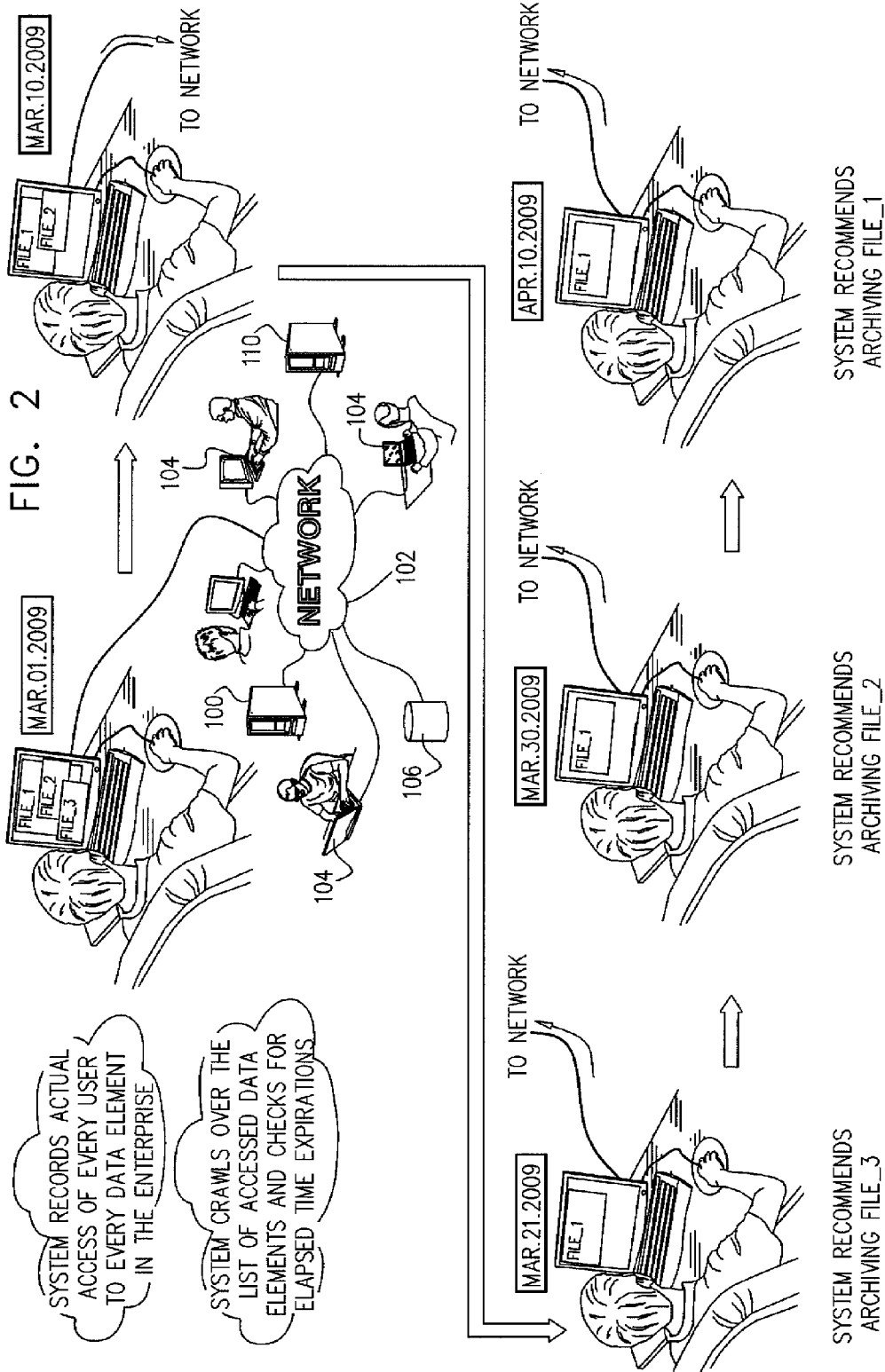
FIG. 2 is a simplified pictorial illustration of the operation of an archiving management system constructed and operative in accordance with a preferred embodiment of the present invention.
Figure 3:
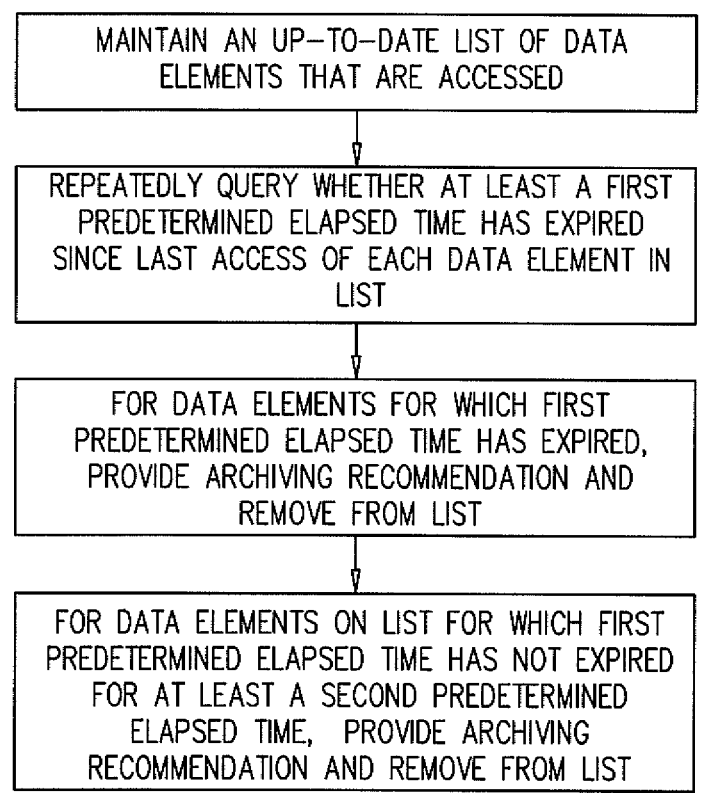
FIGS. 3 and 4 are simplified flowcharts indicating steps in the operation of the archiving management system of FIG. 2.
Figure 4:
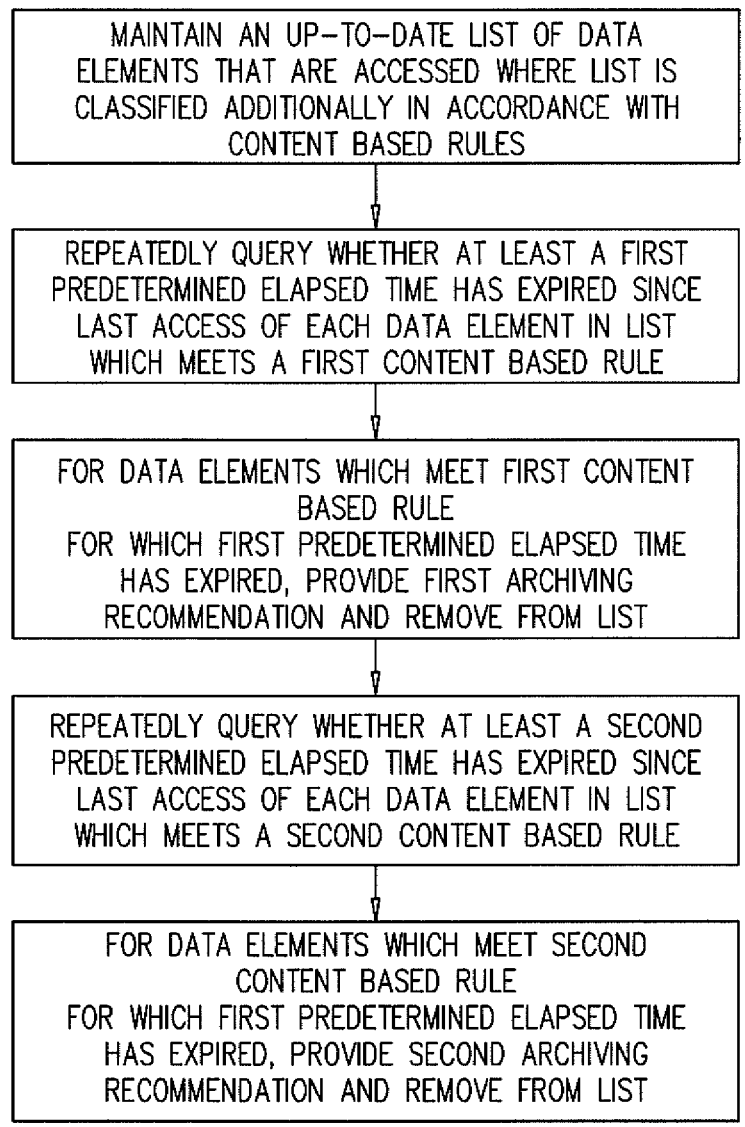

Reference is now made to FIG. 2, which is a simplified pictorial illustration of the operation of an archiving management system, constructed and operative in accordance with an embodiment of the present invention, and to FIGS. 3 & 4, which are simplified flowcharts indicating steps in the operation of the archiving management system. The archiving management system constitutes one example of a system for operating an enterprise computer network including multiple disparate clients, data elements, computer hardware resources and computer software resources in accordance with a preferred embodiment of the present invention. Such a system generally includes:

actual access reporting functionality operative to indicate which clients actually accessed which data elements within a given time period;

access permission reporting functionality operative to provide a list of data elements that may be accessed by a predefined group of users;

actual access report responsive operating functionality operative in response to actual access reporting received from the actual access reporting functionality to provide operative recommendations for archiving functionality, based on the actual access reporting; and access permission report responsive operating functionality operative in response to access permission reporting received from the access permission reporting functionality to provide operative recommendations for archiving functionality, based on the access permission reporting.

As noted hereinabove with reference to FIG. 1, it is appreciated that the system may reside on a server 100, connected to an enterprise level network 102 to which may be connected hundreds or thousands of computers 104 and storage devices 106. As illustrated in FIG. 1, the server preferably records actual access of every user to every data element, such as a file, in the enterprise, in matrix 108.

As seen in FIG. 2, the system recommends that all data elements actually accessed by any user during a given day, such as Mar. 1, 2009, be copied to a backup storage facility.

An associated archiving system, which may be resident on another server 110, may carry out the archiving recommendation.

Additionally or alternatively, the system preferably iterates through a list of data elements and checks the content, metadata, location, owner, and access permissions thereof. Any data element containing content indicating, for example, that the data element is confidential, is owned by a sensitive unit in the enterprise or is accessible by certain individuals in the enterprise, is recommended to be copied to the backup storage facility on a daily basis.

Additionally or alternatively, the system preferably iterates through a list of data elements and checks for recommendations for changes in access permissions thereto. For example, all data elements having recommendations for changes in access permissions thereto are also recommended to be copied to the backup storage facility on a daily basis.

Preferably, the system iterates through a list of data elements and checks whether a first predetermined time period has elapsed since the last actual access to each of the data elements. It is appreciated that the first predetermined time period may be a fixed time or alternatively a time which varies based on other parameters.

As seen in FIGS. 2 & 3, at the expiration of the first predetermined time period, such as on Mar. 21, 2009, the system recommends that all data elements not actually accessed, or accessed less than a predetermined number of times, during the predetermined period, such as twenty days, be migrated to a remote storage facility.

As also seen in FIGS. 2 & 3, at the expiration of a second predetermined time period, such as on Apr. 10, 2009, the system recommends that all data elements that have not been migrated to the remote storage facility within the second predetermined period, be migrated to the remote storage facility.

Alternatively, as seen in FIG. 4, at the expiration of the first predetermined time period, such as on Mar. 21, 2009, the system recommends that all data elements not actually accessed, or accessed less than a predetermined number of times, during the predetermined period, such as twenty days, and that match a predetermined set of content-based rules, be migrated to the remote storage facility.

As also seen in FIG. 4, at the expiration of a second predetermined time period, such as on Apr. 10, 2009, the system recommends that all data elements that have not been migrated to the remote storage facility within the second predetermined period and that match a predetermined set of content-based rules, be migrated to the remote storage facility.

Additionally or alternatively, any data element containing content indicating that the data element contains personal identity information or sensitive information is also recommended to be migrated to a secure storage facility.

Additionally or alternatively, all data elements having recommendations for changes in access permissions thereto are also recommended to be migrated to the remote storage facility.

At various times a user may initiate a migration of data elements to a new storage device. In such a case, the system may also recommend that all data elements actually accessed by any specified user or group of users, be migrated to the new storage device.

Additionally or alternatively, any data element containing content indicating that the data element is relevant to subjects defined by the user are also recommended to be copied to the new storage device.

Additionally or alternatively, at various times the system may recommend that all data elements actually accessed by any specified user or group of users, be replicated on the backup storage facility.

Additionally or alternatively, all data elements whose content indicates that they are relevant to predetermined subjects are also recommended to be replicated on the backup storage facility.

The associated archiving system, which may be resident on another server 110, may carry out the archiving recommendations.

Figure 5:
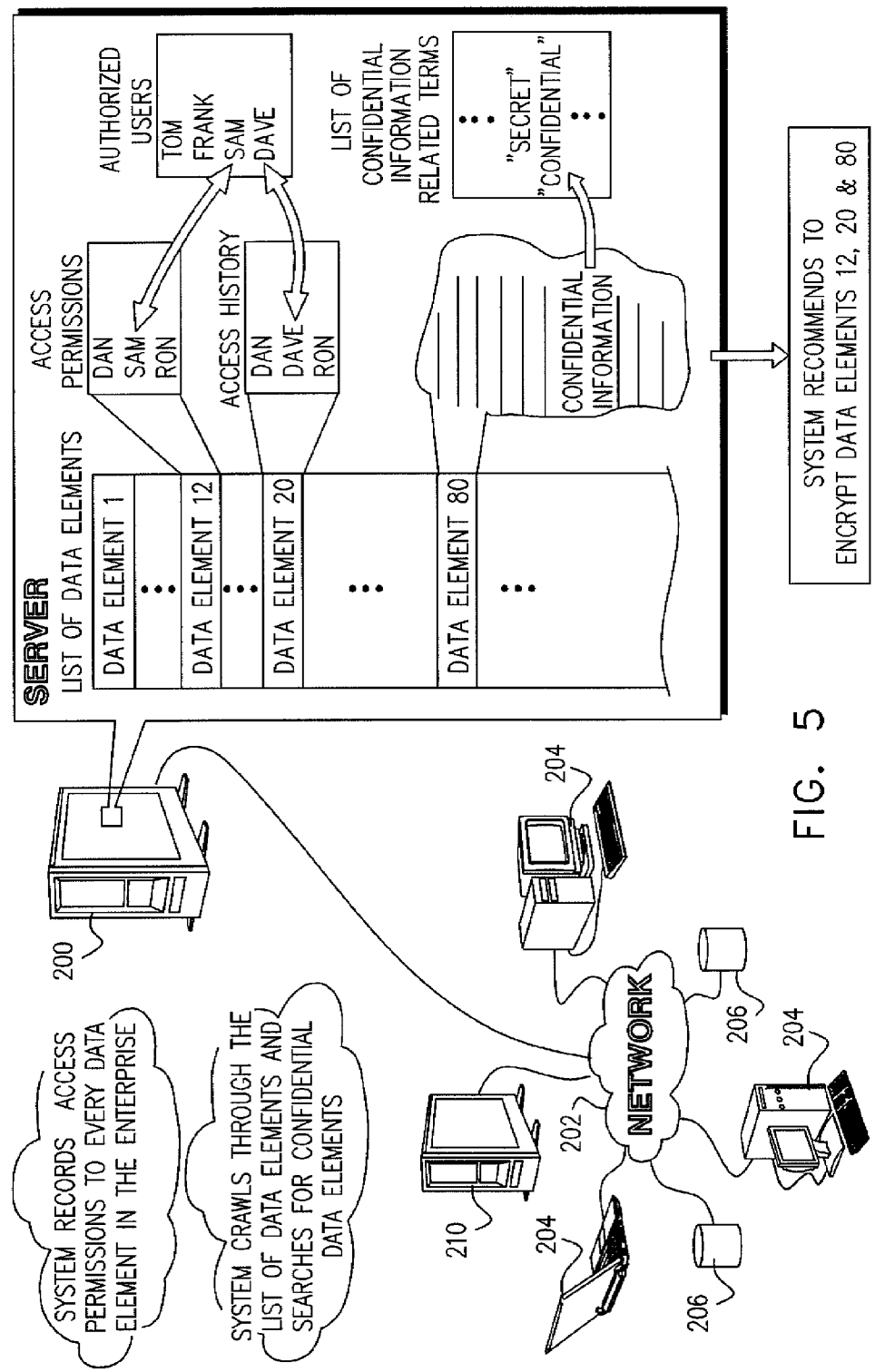
FIG. 5 is a simplified pictorial illustration of the operation of an encryption management system constructed and operative in accordance with another preferred embodiment of the present invention.
Figure 6:
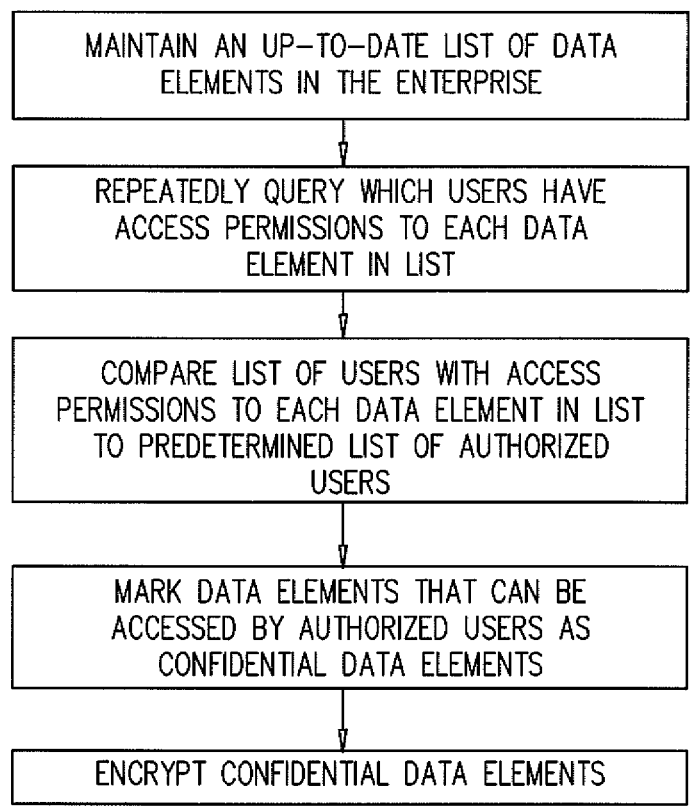
FIGS. 6, 7 and 8 are simplified flowcharts indicating steps in the operation of the encryption management system of FIG. 5.
Figure 7:
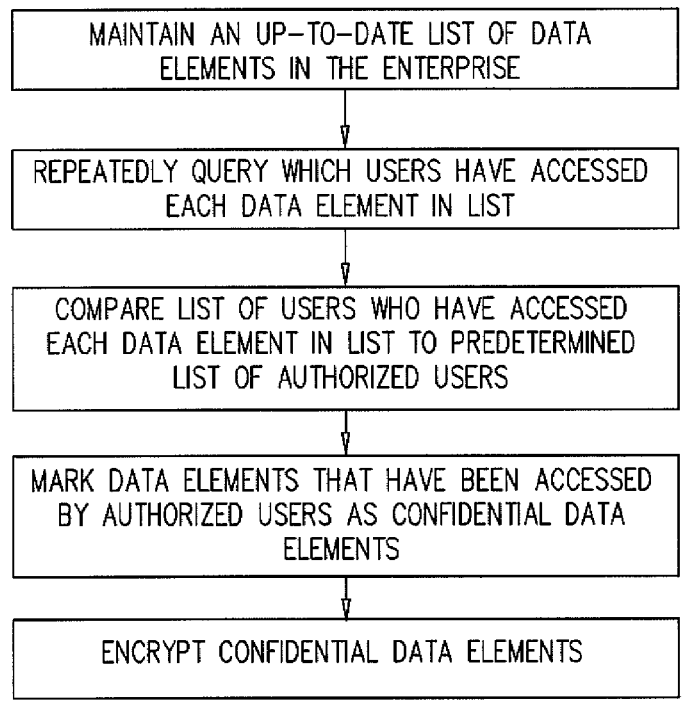
Figure 8:
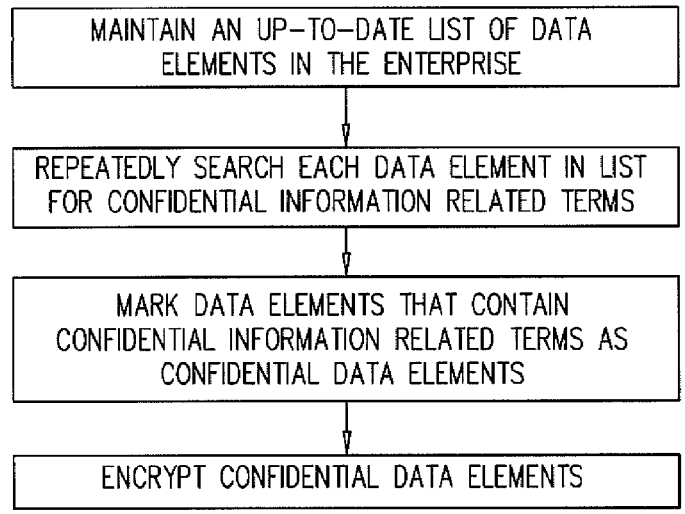

Reference is now made to FIG. 5, which is a simplified pictorial illustration of the operation of an encryption management system, constructed and operative in accordance with another embodiment of the present invention, and to FIGS. 6, 7 and 8, which are simplified flowcharts indicating steps of the operation of the encryption management system. The encryption management system constitutes another example of a system for operating an enterprise computer network including multiple disparate clients, data elements, computer hardware resources and computer software resources in accordance with another embodiment of the present invention. Such a system generally includes:

access permission reporting functionality operative to provide a list of data elements that may be accessed by a predefined group of users;

actual access reporting functionality operative to indicate which clients actually accessed which data elements within a given time period;

access permission report responsive operating functionality operative in response to access permission reporting received from the access permission reporting functionality to provide operative recommendations for encryption functionality, based on the access permission reporting; and actual access report responsive operating functionality operative in response to actual access reporting received from the actual access reporting functionality to provide operative recommendations for encryption functionality, based on the actual access reporting.

Turning now to FIG. 5, it is appreciated that the system may reside on a server 200, connected to an enterprise level network 202 to which may be connected hundreds or thousands of computers 204 and storage devices 206. Similar to server 100 illustrated in FIG. 1, the server 200 preferably records access permissions to every data element, such as a file, in the enterprise.

As seen in FIGS. 5 & 6, the system preferably iterates through the list of data elements at predetermined intervals. For each data element, the system retrieves a list of users who have access permissions to the data element and compares the list of users to a predetermined list of authorized users, each of which being authorized to access confidential enterprise information, thereby determining which of the data elements may be accessed by the authorized users. The system then compiles a list of confidential data elements that may be accessed by the authorized users.

Additionally or alternatively, as seen in FIGS. 5 & 7, the system preferably iterates through the list of data elements at predetermined intervals. For each data element, the system retrieves a list of users who have actually accessed each data element during the last predetermined interval and compares the list of users to the predetermined list of authorized users each of which being authorized to access confidential enterprise information, thereby determining which of the data elements have been accessed by the authorized users. The system then compiles a list of confidential data elements that have been accessed by the authorized users.

Additionally or alternatively, as seen in FIGS. 5 & 8, the system preferably iterates through the list of data elements at predetermined intervals, and searches each data element for the appearance of confidential information related terms, such as "confidential". The system then compiles a list of confidential data elements containing the confidential information related terms.

In the illustrated example, the system recommends that all the confidential data elements be encrypted. An associated encryption system which may be resident on another server 210, may carry out the encryption recommendation.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for operating an enterprise computer network including multiple disparate clients, data elements and computer resources, said system comprising:
   a processor having the following functionalities:
   monitoring and collection functionality for providing and storing continuously updated metadata relating to at least one of actual access, access permissions and content of all of said data elements; and
   classifying functionality operable, responsive to said storing, for utilizing said stored continuously updated metadata provided by said monitoring and collection functionality to classify at least a subset of said data elements upon which functions other than reporting said at least one of actual access, access permissions and content or recommending changes in said access permissions are executed.

2. A system according to claim 1 and wherein said functions other than actual access reporting include archiving.

3. A system according to claim 1 and wherein said functions other than actual access reporting include encrypting.

4. A system according to claim 1 and wherein said system resides on a computer server which is connected to an enterprise level network to which is connected a multiplicity of computers and storage devices.

5. A system according to claim 1 and wherein said computer resources include hardware resources and software resources.

6. A system for operating an enterprise computer network including multiple disparate clients, data elements and computer resources, said system comprising:
   a processor having the following functionalities:
   monitoring and collection functionality for providing and storing continuously updated metadata relating to actual access, access permissions and content of all of said data elements; and
   classifying functionality operable, responsive to said storing, for utilizing said stored continuously updated metadata provided by said monitoring and collection functionality to classify at least a subset of said data elements and to recommend archiving of said at least subset of said data elements.

7. A system according to claim 6 and wherein said system also comprises a backup storage facility connected to said enterprise computer network.

8. A system according to claim 6 and wherein said system also comprises a remote storage facility connected to said enterprise computer network.

9. A system according to claim 6 and wherein said system also comprises a secure storage facility connected to said enterprise computer network.

10. A system according to claim 6 and wherein said computer resources include hardware resources and software resources.

11. A system according to claim 7 and wherein every day said system copies any of said data elements actually accessed by any user on said day to said backup storage facility.

12. A system according to claim 7 and wherein said system copies any of said data elements whose content indicates that they are confidential, are owned by a sensitive unit in said enterprise or are accessible by authorized individuals in said enterprise to said backup storage facility on a daily basis.

13. A system according to claim 7 and wherein said system copies any of said data elements marked with recommendations for changes in access permissions thereto to said backup storage facility on a daily basis.

14. A system according to claim 8 and wherein said system migrates to said remote storage facility any of said data elements that have recommendations for changes in access permissions thereto.

15. A system according to claim 8 and wherein said system migrates to said remote storage facility any of said data elements that have not been accessed for a first predetermined time period.

16. A system according to claim 8 and wherein said system migrates to said remote storage facility any of said data elements that have not been accessed for a first predetermined time period and that contain content indicating that they are confidential, are owned by a sensitive unit in said enterprise or are accessible by authorized individuals in said enterprise.

17. A system according to claim 8 and wherein said system migrates to said remote storage facility any of said data elements that have not been migrated to said remote storage facility for a second predetermined time period.

18. A system according to claim 8 and wherein said system migrates to said remote storage facility any of said data elements that have not been migrated to said remote storage facility for a second predetermined time period and that contain content indicating that they are confidential, are owned by a sensitive unit in said enterprise or are accessible by authorized individuals in said enterprise.

19. A system according to claim 9 and wherein said system migrates to said secure storage facility any of said data elements that contain personal identity information or sensitive information.

20. A system according to claim 6 and wherein when a user initiates a migration of data elements to a new storage device, the system recommends that all data elements actually accessed by any specified user or group of users, be migrated to said new storage device.

21. A system according to claim 7 and wherein at various times the system recommends that all data elements actually accessed by any specified user or group of users, be replicated to said backup storage facility.

22. A system according to claim 7 and wherein said system replicates to said backup storage facility any of said data elements whose content indicates that they are relevant to predetermined subjects.

23. A system according to claim 6 and wherein said system resides on a computer server which is connected to an enterprise level network to which is connected a multiplicity of computers and storage devices.

24. A system according to claim 23 and wherein an associated archiving system resides on a server other than said computer server.

25. A system for operating an enterprise computer network including multiple disparate clients, data elements and computer resources, said system comprising:
a processor having the following functionalities:
monitoring and collection functionality for providing and storing continuously updated metadata relating to actual access, access permissions and content of all of said data elements; and
classifying functionality operable, responsive to said storing, for utilizing said stored continuously updated metadata provided by said monitoring and collection functionality to classify at least a subset of said data elements and to recommend encrypting said at least subset of said data elements.

26. A system according to claim 25 and wherein for each individual data element of said data elements, at predetermined time intervals said system:
compiles a list of users having access permissions to said each individual data element;
compares said list of users to a predetermined list of authorized users, each of said authorized users being authorized to access confidential enterprise information;
labels said each individual data element that may be accessed by any of said authorized users as a confidential data element; and
encrypts said confidential data elements.

27. A system according to claim 25 and wherein for each individual data element of said data elements, at predetermined time intervals said system:
compiles a list of users actually having accessed said each individual data element;
compares said list of users to a predetermined list of authorized users, each of said authorized users being authorized to access confidential enterprise information;
labels said each individual data element that has been accessed by any of said authorized users as a confidential data element; and
encrypts said confidential data elements.

28. A system according to claim 25 and wherein for each individual data element of said data elements, at predetermined time intervals said system:
searches said each individual data element for the appearance of any of a predetermined list of confidential information related terms;
labels said each individual data element that contains any of said predetermined list of confidential information related terms as a confidential data element; and
encrypts said confidential data elements.

29. A system according to claim 25 and wherein said computer resources include hardware resources and software resources.

30. A system according to claim 25 and wherein said system resides on a computer server which is connected to an enterprise level network to which is connected a multiplicity of computers and storage devices.

31. A system according to claim 30 and wherein an associated encryption system resides on a server other than said computer server.

32. A method for operating an enterprise computer network including multiple disparate clients, data elements and computer resources, said method comprising using at least one server for:
monitoring, collecting and storing continuously updated metadata relating to at least one of actual access, access permissions and content of all of said data elements; and
responsive to said storing, utilizing said stored continuously updated metadata for classifying at least a subset of said data elements upon which functions other than reporting said at least one of actual access, access permissions and content or recommending changes in said access permissions are executed.

33. A method according to claim 32 and wherein said functions other than actual access reporting include archiving.

34. A method according to claim 32 and wherein said functions other than actual access reporting include encrypting.

35. A method according to claim 32 and wherein said computer resources include hardware resources and software resources.

36. A method for operating an enterprise computer network including multiple disparate clients, data elements and computer resources, said method comprising using at least one server for:
monitoring, collecting and storing continuously updated metadata relating to actual access, access permissions and content of all of said data elements; and
responsive to said storing, utilizing said stored continuously updated metadata to classify at least a subset of said data elements and to recommend archiving of said at least subset of said data elements.

37. A method according to claim 36 and wherein said method also comprises providing a backup storage facility connected to said enterprise computer network.

38. A method according to claim 36 and wherein said method also comprises providing a remote storage facility connected to said enterprise computer network.

39. A method according to claim 36 and wherein said method also comprises providing a secure storage facility connected to said enterprise computer network.

40. A method according to claim 36 and wherein said computer resources include hardware resources and software resources.

41. A method according to claim 37 and wherein every day any of said data elements actually accessed by any user on said day are copied to said backup storage facility.

42. A method according to claim 37 and wherein any of said data elements whose content indicates that they are confidential, are owned by a sensitive unit in said enterprise or are accessible by authorized individuals in said enterprise are copied to said backup storage facility on a daily basis.

43. A method according to claim 37 and wherein any of said data elements marked with recommendations for changes in access permissions thereto are copied to said backup storage facility on a daily basis.

44. A method according to claim 38 and wherein any of said data elements that have recommendations for changes in access permissions thereto are migrated to said remote storage facility.

45. A method according to claim 38 and wherein any of said data elements that have not been accessed for a first predetermined time period are migrated to said remote storage facility.

46. A method according to claim 38 and wherein any of said data elements that have not been accessed for a first predetermined time period and that contain content indicating that they are confidential, are owned by a sensitive unit in said enterprise or are accessible by authorized individuals in said enterprise are migrated to said remote storage facility.

47. A method according to claim 38 and wherein any of said data elements that have not been migrated to said remote storage facility for a second predetermined time period are migrated to said remote storage facility.

48. A method according to claim 38 and wherein any of said data elements that have not been migrated to said remote storage facility for a second predetermined time period and that contain content indicating that they are confidential, are owned by a sensitive unit in said enterprise or are accessible by authorized individuals in said enterprise are migrated to said remote storage facility.

49. A method according to claim 39 and wherein any of said data elements that contain personal identity information or sensitive information are migrated to said secure storage facility.

50. A method according to claim 36 and wherein when a user initiates a migration of data elements to a new storage device, all data elements actually accessed by any specified user or group of users are recommended to be migrated to said new storage device.

51. A method according to claim 37 and wherein at various times all data elements actually accessed by any specified user or group of users are recommended to be replicated to said backup storage facility.

52. A method according to claim 37 and wherein any of said data elements whose content indicates that they are relevant to predetermined subjects are replicated to said backup storage facility.

53. A method for operating an enterprise computer network including multiple disparate clients, data elements and computer resources, said method comprising using at least one server for:
 monitoring, collecting and storing continuously updated metadata relating to actual access, access permissions and content of all of said data elements; and
 responsive to said storing, utilizing said stored continuously updated metadata to classify at least a subset of said data elements and to recommend encrypting said at least subset of said data elements.

54. A method according to claim 53 and wherein for each individual data element of said data elements, at predetermined time intervals:
 a list of users having access permissions to said each individual data element is compiled;
 said list of users is compared to a predetermined list of authorized users, each of said authorized users being authorized to access confidential enterprise information;
 said each individual data element that may be accessed by any of said authorized users is labeled as a confidential data element; and
 said confidential data elements are encrypted.

55. A method according to claim 53 and wherein for each individual data element of said data elements, at predetermined time intervals:
 a list of users actually having accessed said each individual data element is compiled;
 said list of users is compared to a predetermined list of authorized users, each of said authorized users being authorized to access confidential enterprise information;
 said each individual data element that has been accessed by any of said authorized users is labeled as a confidential data element; and
 said confidential data elements are encrypted.

56. A method according to claim 53 and wherein for each individual data element of said data elements, at predetermined time intervals:
 said each individual data element is searched for the appearance of any of a predetermined list of confidential information related terms;
 said each individual data element that contains any of said predetermined list of confidential information related terms is labeled as a confidential data element; and
 said confidential data elements are encrypted.

57. A method according to claim 53 and wherein said computer resources include hardware resources and software resources.

\* \* \* \* \*